US012142829B2

(12) United States Patent
Hu

(10) Patent No.: US 12,142,829 B2
(45) Date of Patent: Nov. 12, 2024

(54) COMPACT BROADBAND CIRCULARLY POLARIZED ANTENNA

(71) Applicant: Nan Hu, Beijing (CN)

(72) Inventor: Nan Hu, Beijing (CN)

(*) Notice: Subject to any disclaimer, the term of this patent is extended or adjusted under 35 U.S.C. 154(b) by 0 days.

(21) Appl. No.: 18/622,936

(22) Filed: Mar. 30, 2024

(65) Prior Publication Data

US 2024/0243481 A1 Jul. 18, 2024

Related U.S. Application Data

(63) Continuation of application No. PCT/CN2022/095729, filed on May 27, 2022.

(30) Foreign Application Priority Data

Sep. 30, 2021 (CN) .......................... 202111160197.1

(51) Int. Cl.
*H01Q 13/02* (2006.01)
*H01Q 5/25* (2015.01)

(52) U.S. Cl.
CPC ........... *H01Q 13/0275* (2013.01); *H01Q 5/25* (2015.01); *H01Q 13/0258* (2013.01); *H01Q 13/0266* (2013.01)

(58) Field of Classification Search
CPC ...... H01Q 5/25; H01Q 13/02; H01Q 13/0258; H01Q 13/0266; H01Q 13/0275
See application file for complete search history.

(56) References Cited

U.S. PATENT DOCUMENTS

| | | | | |
|---|---|---|---|---|
| 3,458,862 A * | 7/1969 | Franks | H01Q 13/0275 | 333/242 |
| 3,958,192 A | 5/1976 | Rootsey | | |
| 5,517,203 A * | 5/1996 | Fiedziuszko | H01Q 19/17 | 343/756 |
| 7,688,268 B1 | 3/2010 | West et al. | | |
| 9,991,607 B1 | 6/2018 | West et al. | | |
| 2015/0303559 A1 | 10/2015 | Tateishi | | |

(Continued)

FOREIGN PATENT DOCUMENTS

| | | |
|---|---|---|
| CN | 102394382 A | 3/2012 |
| CN | 102694264 A | 9/2012 |

(Continued)

*Primary Examiner* — Daniel Munoz
(74) *Attorney, Agent, or Firm* — The Sun IP Law

(57) ABSTRACT

A compact broadband circularly polarized antenna includes an antenna body, wherein a cavity is formed in the antenna body, a plurality of ridges and a plurality of baffles are formed inside the cavity, the ridges are configured for antenna miniaturization and bandwidth widening, and the baffles are configured to form a spatial phase difference. In the present disclosure, the ridges of the circularly polarized antenna are divided into two parts, wherein the ridges located in a baffle mounting rectangular section and a front rectangular mounting section are configured for antenna miniaturization and bandwidth widening, and the baffles for forming a phase difference are arranged between the ridges located in the baffle mounting rectangular section. Through the above arrangement, the polarized antenna may be miniaturized, operate in a millimeter wave band, and achieve circular polarization; the bandwidth of the antenna is relatively wide.

9 Claims, 15 Drawing Sheets

(56) References Cited

U.S. PATENT DOCUMENTS

| | | | |
|---|---|---|---|
| 2017/0069972 | A1 | 3/2017 | Miller et al. |
| 2021/0203076 | A1 | 7/2021 | Boin |

FOREIGN PATENT DOCUMENTS

| | | | |
|---|---|---|---|
| CN | 105720373 | A | 6/2016 |
| CN | 108899655 | A | 11/2018 |
| CN | 209526200 | U | 10/2019 |
| CN | 110600877 | A | 12/2019 |
| CN | 212783816 | U | 3/2021 |
| CN | 112886255 | A | 6/2021 |
| CN | 113889745 | A | 1/2022 |
| KR | 101427148 | B1 * | 8/2014 |

* cited by examiner

COMPACT BROADBAND CIRCULARLY POLARIZED ANTENNA

CROSS-REFERENCE TO RELATED APPLICATION

The present disclosure claims priority to Chinese Patent Application No. 202111160197.1, filed to the China National Intellectual Property Administration on Sep. 30, 2021 and entitled "Compact Broadband Circularly Polarized Antenna", the disclosure of which is hereby incorporated by reference in its entirety.

TECHNICAL FIELD

The present disclosure relates to the technical field of antennas for communication, and in particular to a compact broadband circularly polarized antenna.

BACKGROUND

A circularly polarized antenna exhibits excellent characteristics in resisting strong external interference, which may reduce the polarization loss caused by polarization mismatch and suppress multipath interference of rainy and foggy weather and buildings, and does not require a strict orientation between a transmitting antenna and a receiving antenna, so that the circularly polarized antenna is widely used in communication systems such as satellite communications, mobile communications, and global navigation satellites. With the continuous development of communication technology, there is an increasing demand for a compact broadband circularly polarized antenna and array operating in a millimeter wave band. However, the existing circularly polarized antenna is complex in structure, large in size, and not prone to array formation.

SUMMARY

The technical problem to be solved is how to provide a compact broadband circularly polarized antenna that has a simple structure, may operate in a millimeter wave band, and is able to form a spatial phase difference.

In order to solve the above technical problem, the technical solution adopted in the present disclosure is that: a compact broadband circularly polarized antenna includes an antenna body. A cavity is formed in the antenna body, a plurality of ridges and a plurality of baffles are formed inside the cavity, the ridges are configured for antenna miniaturization and bandwidth widening, and the baffles are configured to form a spatial phase difference.

In some embodiments, the cavity includes a baffle mounting rectangular section located on a rightmost side. A front rectangular mounting section is formed on a left side of the baffle mounting rectangular section, an intermediate transition section is formed on a left side of the front rectangular mounting section, and a rear rectangular section with a standard rectangular waveguide port is formed on a left side of the intermediate transition section.

In some embodiments, a distance between an upper inner wall and a lower inner wall of the baffle mounting rectangular section is greater than a distance between an upper inner wall and a lower inner wall of the front rectangular mounting section, one first rectangular ridge is formed in a middle of each of the upper inner wall and the lower inner wall of the front rectangular mounting section, two first rectangular ridges are oppositely arranged, one second rectangular ridge is formed in a middle of each of the upper inner wall and the lower inner wall of the baffle mounting rectangular section, two second rectangular ridges are oppositely arranged, and two baffles are respectively fixed in the baffle mounting rectangular section between the first rectangular ridge and the second rectangular ridge on a corresponding side.

In some embodiments, the two baffles are in a shape of a right-angled triangle as a whole, and the two baffles are arranged in parallel and partially overlap in a vertical projection direction. A bevel edge of one baffle of the two baffles faces leftwards, and a bevel edge of the other baffle of the two baffles faces rightwards, so that the two second rectangular ridges are separated in a vertical direction through the two baffles, projections of the bevel edges of the two baffles in the vertical direction are oblique lines, and two right-angle sides of each baffle are fixed to the inner wall of the baffle mounting rectangular section.

In some embodiments, the distance between the upper inner wall and the lower inner wall of the baffle mounting rectangular section is greater than the distance between the upper inner wall and the lower inner wall of the front rectangular mounting section, one first rectangular ridge is formed in a middle of each of the upper inner wall and the lower inner wall of the front rectangular mounting section, two first rectangular ridges are oppositely arranged, a first curve ridge is formed in a middle of each of the upper inner wall and the lower inner wall of the baffle mounting rectangular section, two first curve ridges are oppositely arranged, and two baffles are respectively fixed between the first rectangular ridge and the first curve ridge on a corresponding side.

In some embodiments, the two baffles are in a shape of a right-angled triangle as a whole, and the two baffles are arranged in parallel and partially overlap in the vertical projection direction. The bevel edge of one baffle of the two baffles faces leftwards, and the bevel edge of the other baffle of the two baffles faces rightwards, so that the two first curve ridges are separated in the vertical direction through the two baffles, projections of the bevel edges of the two baffles in the vertical direction are oblique lines, and two right-angle sides of each baffle are fixed to the inner wall of the baffle mounting rectangular section.

In some embodiments, the distance between the upper inner wall and the lower inner wall of the baffle mounting rectangular section is greater than the distance between the upper inner wall and the lower inner wall of the front rectangular mounting section, one first rectangular ridge is formed in a middle of each of the upper inner wall and the lower inner wall of the front rectangular mounting section, two first rectangular ridges are oppositely arranged, one second rectangular ridge is formed in a middle of each of the upper inner wall and the lower inner wall of the baffle mounting rectangular section, two second rectangular ridges are oppositely arranged, and two baffles are respectively fixed between the first rectangular ridge and the second rectangular ridge on a corresponding side;

the two baffles are in a shape like a right-angled triangle as a whole, and the two baffles are arranged in parallel and partially overlap in the vertical projection direction. The bevel edge of one baffle of the two baffles faces leftwards, and the bevel edge of the other of the two baffles baffle faces rightwards, so that the two second rectangular ridges are separated in the vertical direction through the two baffles, projections of the bevel edges of the two baffles in the vertical direction are arc-shaped, and two right-angle sides of the baffle are fixed to the inner wall of each baffle mounting rectangular section.

In some embodiments, the distance between the upper inner wall and the lower inner wall of the baffle mounting rectangular section is greater than the distance between the upper inner wall and the lower inner wall of the front rectangular mounting section, one first rectangular ridge is formed in a middle of each of the upper inner wall and the lower inner wall of the front rectangular mounting section, two first rectangular ridges are oppositely arranged, one second rectangular ridge is formed in a middle of each of the upper inner wall and the lower inner wall of the baffle mounting rectangular section, two second rectangular ridges are oppositely arranged, and two baffles are respectively fixed between the first rectangular ridge and the second rectangular ridge on a corresponding side;

the two baffles are in a shape like a right-angled triangle as a whole, and the two baffles are arranged in parallel and partially overlap in the vertical projection direction. The bevel edge of one baffle of the two baffles faces leftwards, and the bevel edge of the other baffle of the two baffles faces rightwards, so that the two second rectangular ridges are separated in the vertical direction through the two baffles, projections of the bevel edges of the two baffles in the vertical direction are stepped, and two right-angle sides of each baffle are fixed to the inner wall of the baffle mounting rectangular section.

The beneficial effects generated by adopting the above technical solution are that: in the present disclosure, the ridges of the circularly polarized antenna are divided into two parts, where the ridges located in the baffle mounting rectangular section and the front rectangular mounting section are configured for antenna miniaturization and bandwidth widening, and the baffles for forming a phase difference are arranged between the ridges located in the baffle mounting rectangular section; through the above arrangement, the polarized antenna may be miniaturized, may operate in a millimeter wave band, and is able to achieve circular polarization; and in addition, the ridges are arranged in the antenna, so that the bandwidth of the antenna is relatively wide.

BRIEF DESCRIPTION OF THE DRAWINGS

The present disclosure is elaborated in detail below with reference to the drawings and specific implementations.

Herein: 1. Antenna body; 2. Cavity; 2-1. Baffle mounting rectangular section; 2-2. Front rectangular mounting section; 2-3. Intermediate transition section; 2-4. Standard rectangular waveguide port; 2-5. Rear rectangular section; 3. Baffle; 4. First rectangular ridge; 5. Second rectangular ridge; 6. First curve ridge; 7. Flange; 8. Positioning dowel.

DETAILED DESCRIPTION OF THE EMBODIMENTS

The technical solutions in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those of ordinary skill in the art based on the embodiments of the disclosure without creative efforts are within the scope of protection of the present disclosure.

In the following description, many specific details are described in order to fully understand the present disclosure, but the present disclosure may also be implemented in other ways different from those described here, and those skilled in the art may make similar extensions without departing from the meaning of the present disclosure. Therefore, the present disclosure is not limited by the specific embodiments disclosed below.

Figure 25:
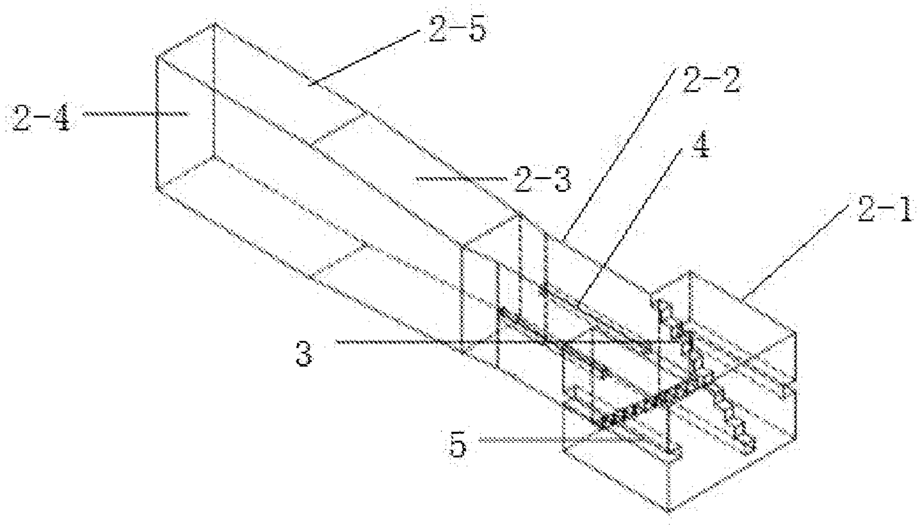
FIG. 25 is a schematic diagram of a fit structure between a cavity and a ridge, as well as a baffle in an embodiment of the present disclosure.

In general, embodiments of the present disclosure disclose a compact broadband circularly polarized antenna, which includes an antenna body 1, which is made of a metal material. A cavity 2 is formed in the antenna body 1, and a plurality of ridges and a plurality of baffles 3 are formed inside the cavity 2. The ridges are configured for antenna miniaturization and bandwidth widening, and the baffles 3 are configured to form a spatial phase difference. In some embodiments, as shown in FIG. 25, which is a schematic diagram of a fit structure between the cavity and the ridges, as well as the baffles. In FIG. 25, the cavity 2 includes a baffle mounting rectangular section 2-1 located on the rightmost side. A front rectangular mounting section 2-2 is formed on a left side of the baffle mounting rectangular section 2-1, an intermediate transition section 2-3 is formed on a left side of the front rectangular mounting section 2-2, and a rear rectangular section 2-5 with a standard rectangular waveguide port 2-4 is formed on a left side of the intermediate transition section 2-3. As shown in FIG. 1 to FIG. 2, FIG. 7 to FIG. 8, FIG. 13 to FIG. 14, and FIG. 19 to FIG. 20, the antenna body 1 includes a flange 7 located on a periphery of the cavity. A plurality of flange mounting holes and at least one positioning hole are formed in a circumferential direction of the flange 7, and positioning dowels 8 are arranged in some positioning holes. It is to be noted that the structure of the cavity in the present disclosure may also be in other forms, there are various specific structures of the ridge and the baffle, and the circularly polarized antenna in the present disclosure will be described below in conjunction with specific embodiments.

Embodiment 1

As shown in FIG. 1 to FIG. 6, in a compact broadband circularly polarized antenna in the embodiment of the present disclosure, a distance between an upper inner wall and a lower inner wall of the baffle mounting rectangular section 2-1 is greater than a distance between an upper inner wall and a lower inner wall of the front rectangular mounting section 2-2, so that an opening of the compact broadband circularly polarized antenna is relatively large. One first rectangular ridge 4 is formed in a middle of each of the upper inner wall and the lower inner wall of the front rectangular mounting section 2-2, two first rectangular ridges 4 are oppositely arranged, one second rectangular ridge 5 is formed in a middle of each of the upper inner wall and the lower inner wall of the baffle mounting rectangular section 2-1, two second rectangular ridges are oppositely arranged 5, and two baffles 3 are respectively fixed in the baffle mounting rectangular section 2-1 between the first rectangular ridge 4 and the second rectangular ridge 5 on a corresponding side. It is to be noted that the baffles 3 are respectively fixed between the first rectangular ridge 4 and the second rectangular ridge 5 on the corresponding side, and are of a structure formed by looking inwards from the opening of the polarized antenna.

Figure 1:
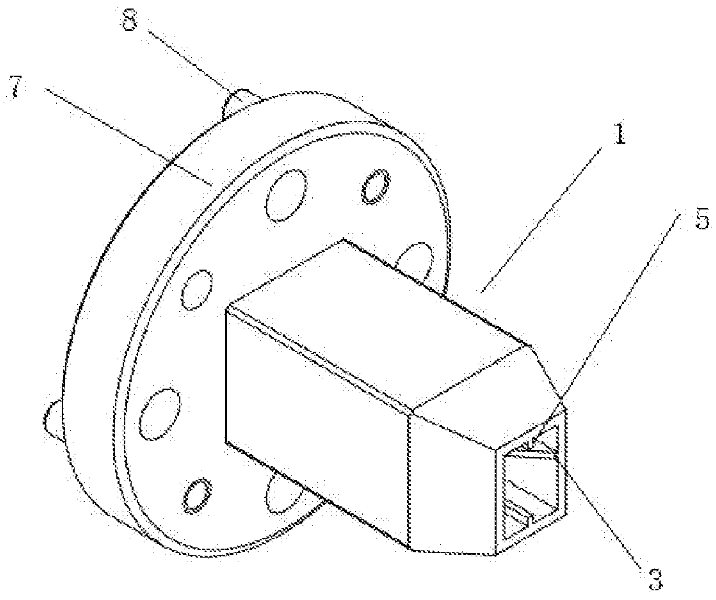
FIG. 1 is a schematic diagram of a three-dimensional structure of a circularly polarized antenna according to Embodiment 1 of the present disclosure.
Figure 2:
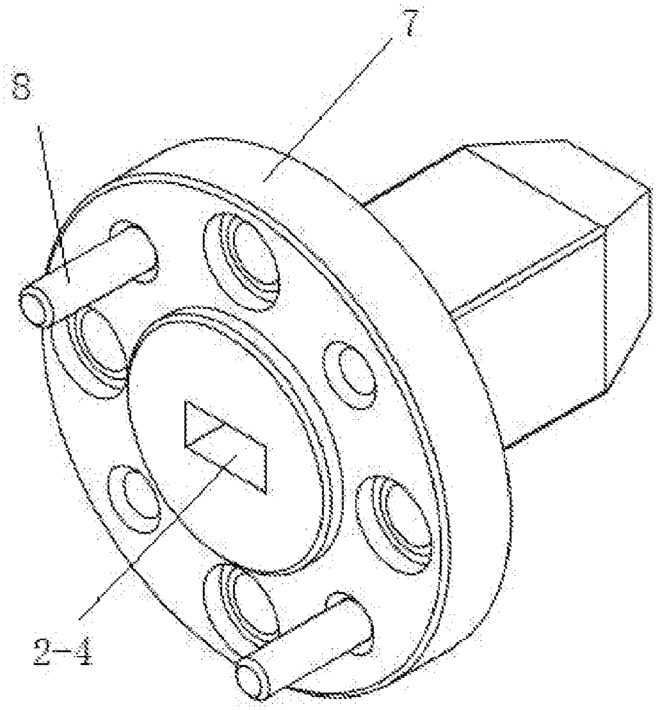
FIG. 2 is a schematic diagram of a three-dimensional structure of a circularly polarized antenna according to Embodiment 1 of the present disclosure.
Figure 3:
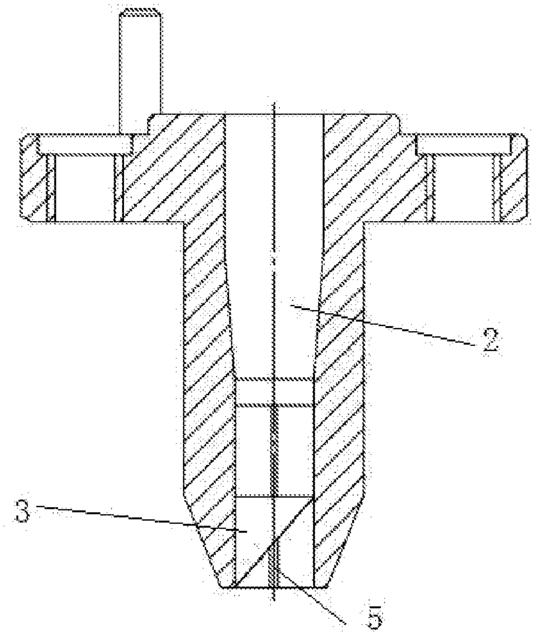
FIG. 3 is a schematic diagram of a cross-sectional structure of a circularly polarized antenna according to Embodiment 1 of the present disclosure.
Figure 4:
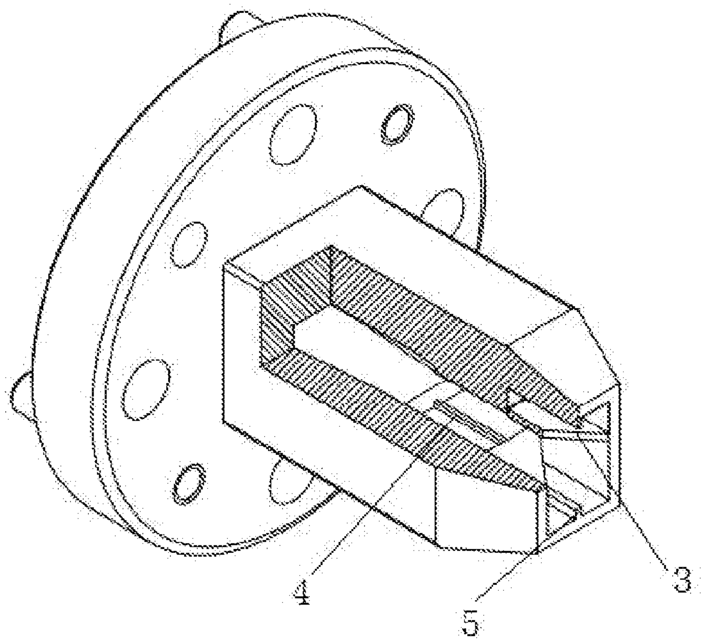
FIG. 4 is a schematic diagram of a partial cross-sectional structure of a circularly polarized antenna according to Embodiment 1 of the present disclosure.
Figure 5:
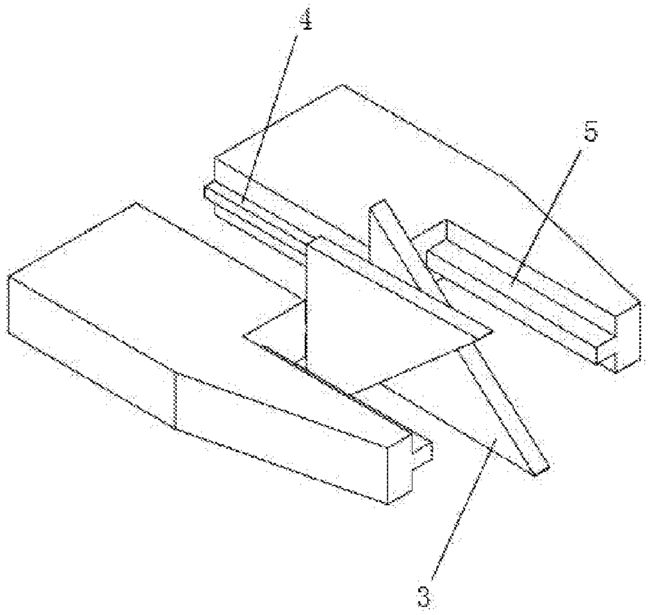
FIG. 5 is a schematic diagram of a partial structure of a circularly polarized antenna according to Embodiment 1 of the present disclosure (rotating counterclockwise by 90 degrees in FIG. 1).
Figure 6:
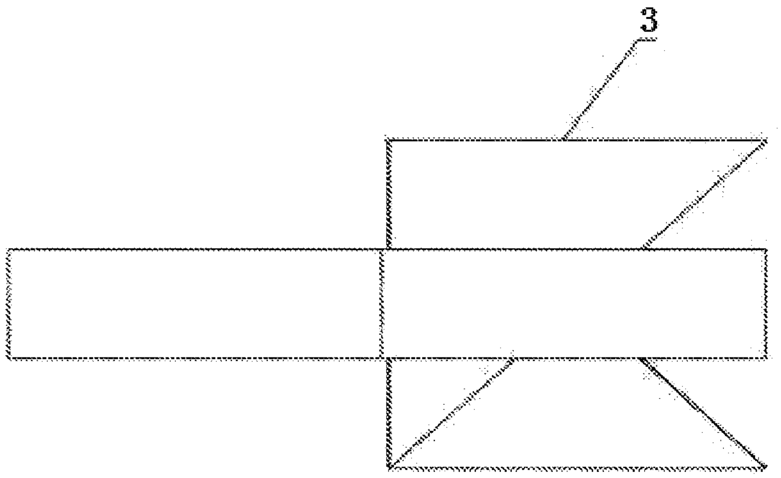
FIG. 6 is a schematic structural diagram of projection of a baffle in a circularly polarized antenna in a vertical direction according to Embodiment 1 of the present disclosure.
Figure 7:
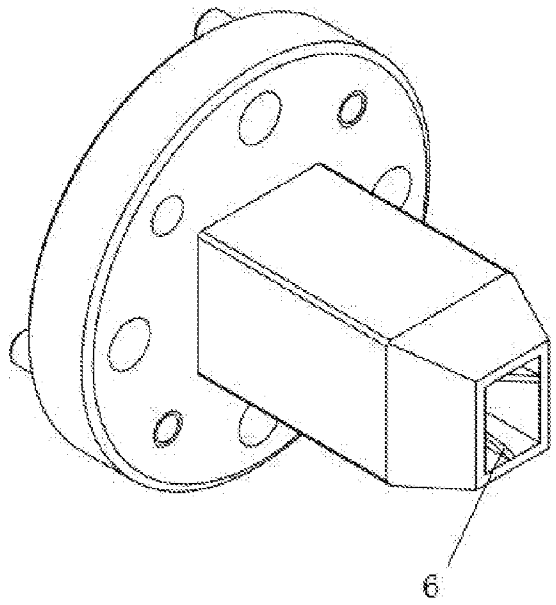
FIG. 7 is a schematic diagram of a three-dimensional structure of a circularly polarized antenna according to Embodiment 2 of the present disclosure.
Figure 8:
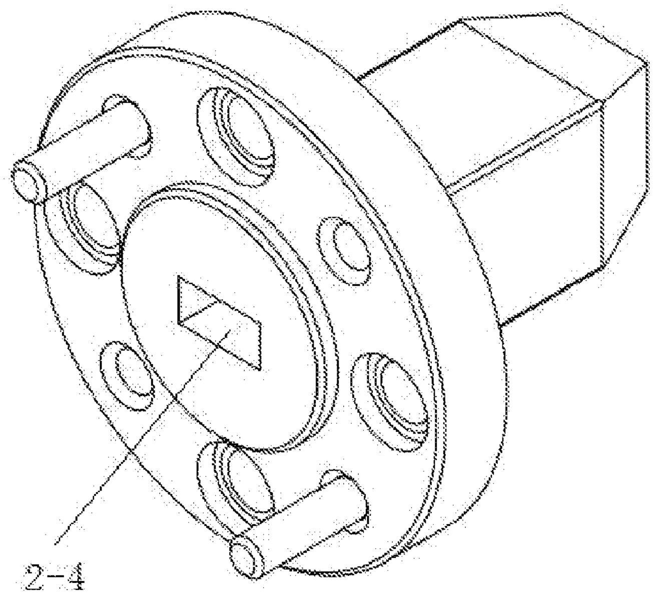
FIG. 8 is a schematic diagram of a three-dimensional structure of a circularly polarized antenna according to Embodiment 2 of the present disclosure.
Figure 9:
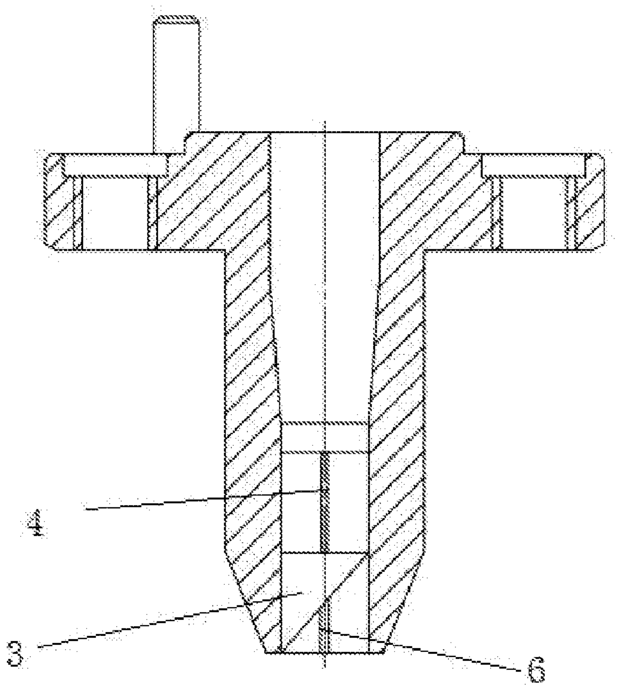
FIG. 9 is a schematic diagram of a cross-sectional structure of a circularly polarized antenna according to Embodiment 2 of the present disclosure.
Figure 10:
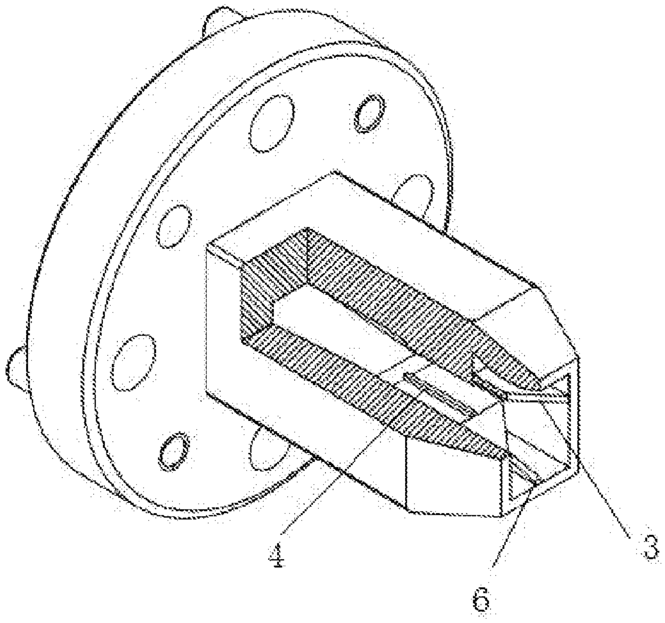
FIG. 10 is a schematic diagram of a partial cross-sectional structure of a circularly polarized antenna according to Embodiment 2 of the present disclosure.

In some embodiments, as shown in FIG. 5 to FIG. 6, the two baffles 3 are in a shape of a right-angled triangle as a whole, and the two baffles 3 are arranged in parallel and partially overlap in a vertical projection direction, where the overlapping area should not be too large or too small and moderate. A bevel edge of one baffle 3 of the two baffles faces leftwards, and a bevel edge of the other baffle 3 of the two baffles faces rightwards, so that the two second rectangular ridges 5 are separated in a vertical direction through the two baffles 3, projections of the bevel edges of the two baffles 3 in the vertical direction are oblique lines, and two right-angle sides of each baffle 3 are fixed to the inner wall of the baffle mounting rectangular section 2-1. It is to be noted that the vertical direction indicated in this embodiment is relative to that shown in FIG. 4.

Embodiment 2

As shown in FIG. 7 to FIG. 12, in a compact broadband circularly polarized antenna in the embodiment of the present disclosure, a distance between an upper inner wall and a lower inner wall of the baffle mounting rectangular section 2-1 is greater than a distance between an upper inner wall and a lower inner wall of the front rectangular mounting section 2-2, so that an opening of the compact broadband circularly polarized antenna is relatively large. One first rectangular ridge 4 is formed in a middle of each of the upper inner wall and the lower inner wall of the front rectangular mounting section 2-2, two first rectangular ridges 4 are oppositely arranged, one first curve ridge 6 is formed in a middle of each of the upper inner wall and the lower inner wall of the baffle mounting rectangular section 2-1, two first curve ridges 6 are oppositely arranged, and two baffles 3 are respectively fixed between the first rectangular ridge 4 and the first curve ridge 6 on a corresponding side.

Figure 11:
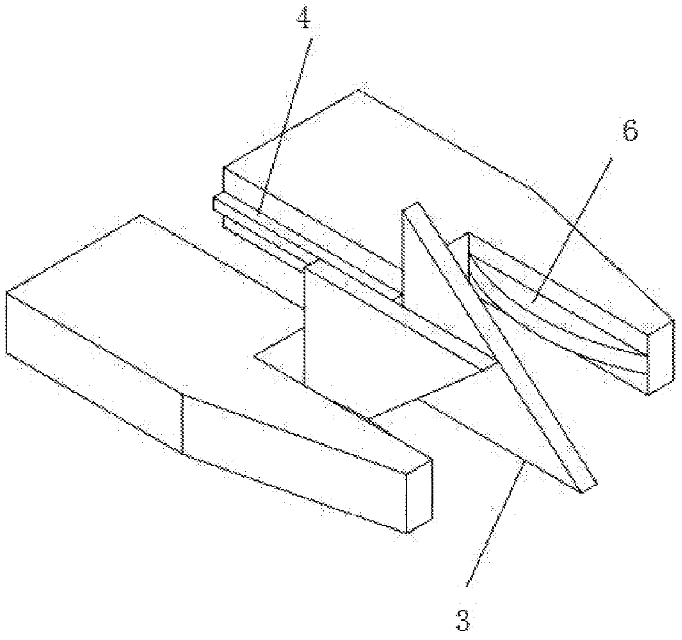
FIG. 11 is a schematic diagram of a partial structure of a circularly polarized antenna according to Embodiment 2 of the present disclosure (rotating counterclockwise by 90 degrees in FIG. 7).
Figure 12:
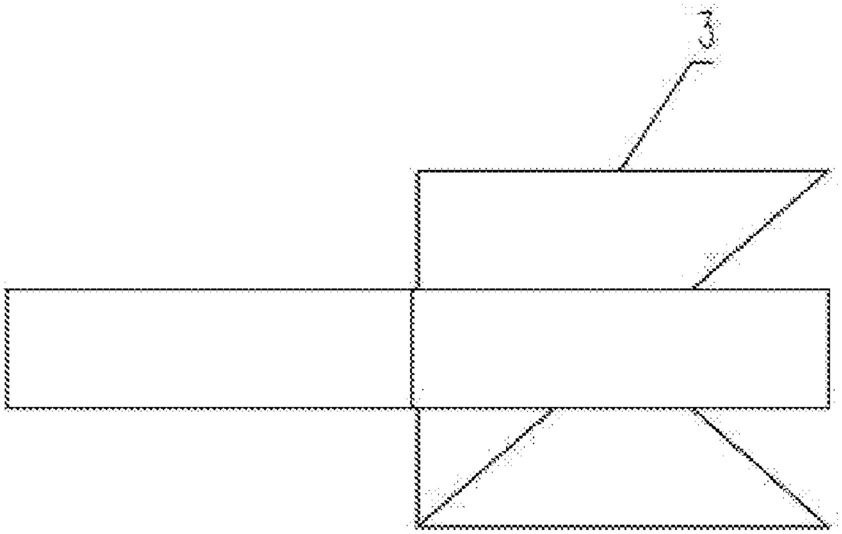
FIG. 12 is a schematic structural diagram of projection of a baffle in a circularly polarized antenna in a vertical direction according to Embodiment 2 of the present disclosure.
Figure 13:
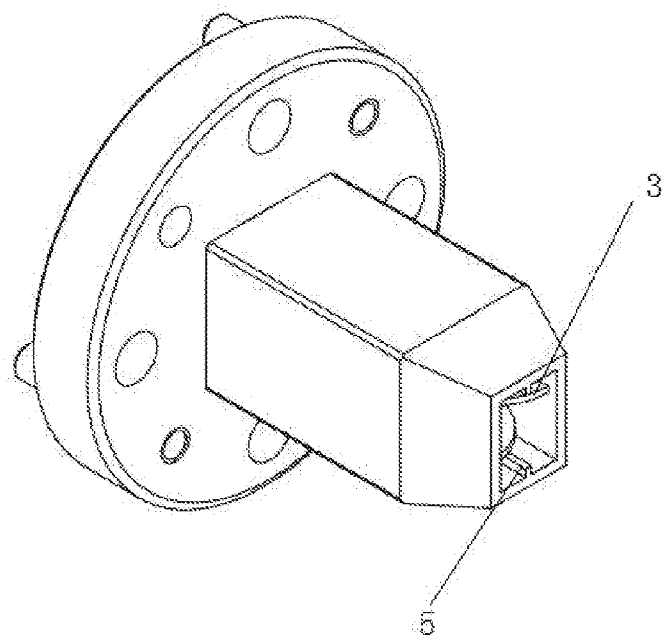
FIG. 13 is a schematic diagram of a three-dimensional structure of a circularly polarized antenna according to Embodiment 3 of the present disclosure.
Figure 14:
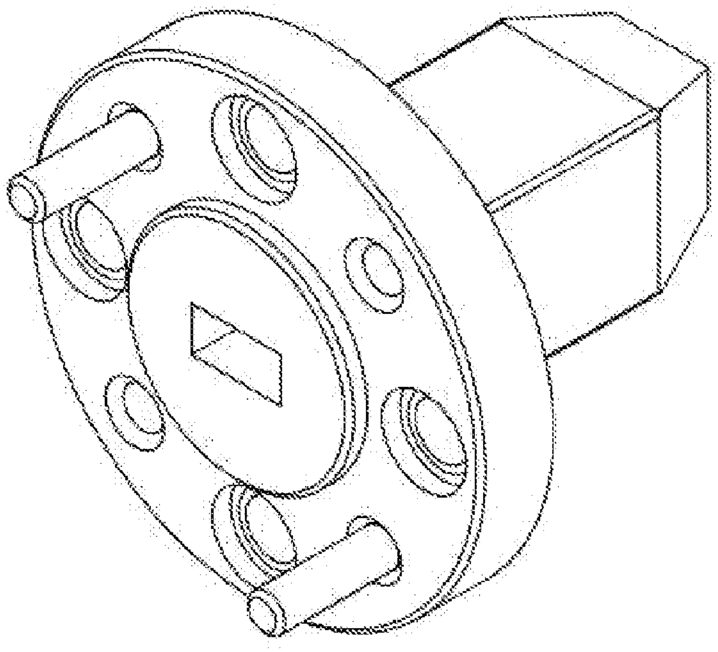
FIG. 14 is a schematic diagram of a three-dimensional structure of a circularly polarized antenna according to Embodiment 3 of the present disclosure.
Figure 15:
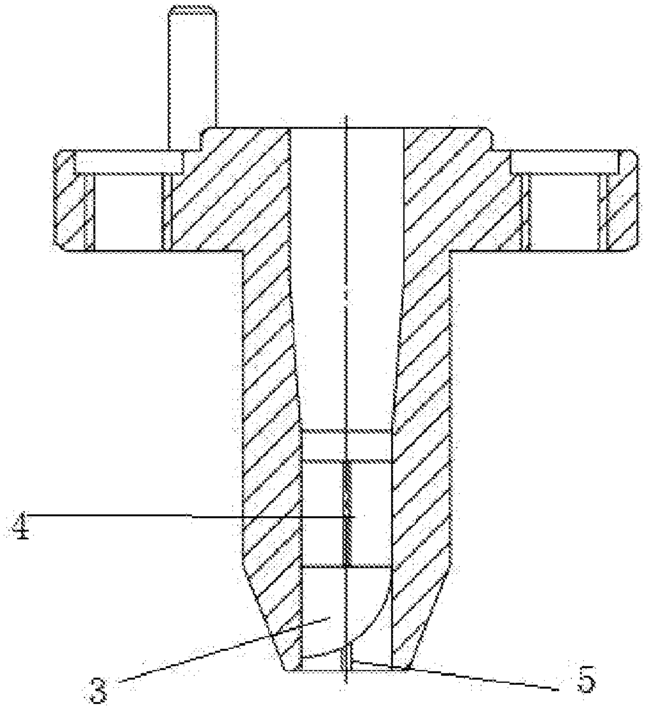
FIG. 15 is a schematic diagram of a cross-sectional structure of a circularly polarized antenna according to Embodiment 3 of the present disclosure.
Figure 16:
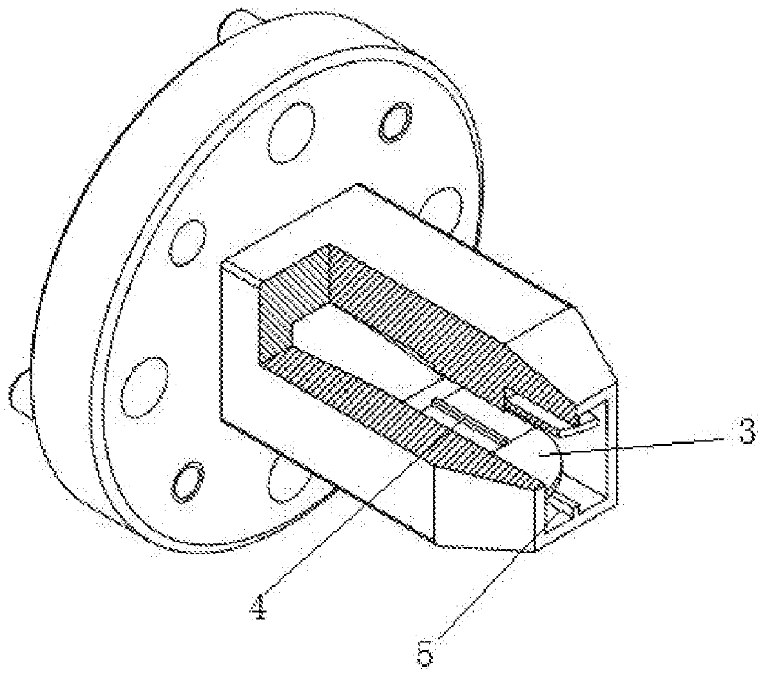
FIG. 16 is a schematic diagram of a partial cross-sectional structure of a circularly polarized antenna according to Embodiment 3 of the present disclosure.

In some embodiments, as shown in FIG. 11 to FIG. 12, the two baffles 3 are in a shape of a right-angled triangle as a whole, and the two baffles 3 are arranged in parallel and partially overlap in a vertical projection direction, where the overlapping area should not be too large or too small and moderate. A bevel edge of one baffle 3 of the two baffles faces leftwards, and a bevel edge of the other baffle 3 of the two baffles faces rightwards, so that the two first curve ridges 6 are separated in a vertical direction through the two baffles 3, projections of the bevel edges of the two baffles 3 in the vertical direction are oblique lines, and two right-angle sides of each baffle 3 are fixed to the inner wall of the baffle mounting rectangular section 2-1. It is to be noted that the vertical direction indicated in this embodiment is relative to that shown in FIG. 10.

Embodiment 3

As shown in FIG. 13 to FIG. 18, in a compact broadband circularly polarized antenna in the embodiment of the present disclosure, a distance between an upper inner wall and a lower inner wall of the baffle mounting rectangular section 2-1 is greater than a distance between an upper inner wall and a lower inner wall of the front rectangular mounting section 2-2, so that an opening of the compact broadband circularly polarized antenna is relatively large. One first rectangular ridge 4 is formed in a middle of each of the upper inner wall and the lower inner wall of the front rectangular mounting section 2-2, two first rectangular ridges 4 are oppositely arranged, one second rectangular ridge 5 is formed in a middle of each of the upper inner wall and the lower inner wall of the baffle mounting rectangular section 2-1, two second rectangular ridges 5 are oppositely arranged, and two baffles 3 are respectively fixed between the first rectangular ridge 4 and the second rectangular ridge 5 on a corresponding side.

Figure 17:
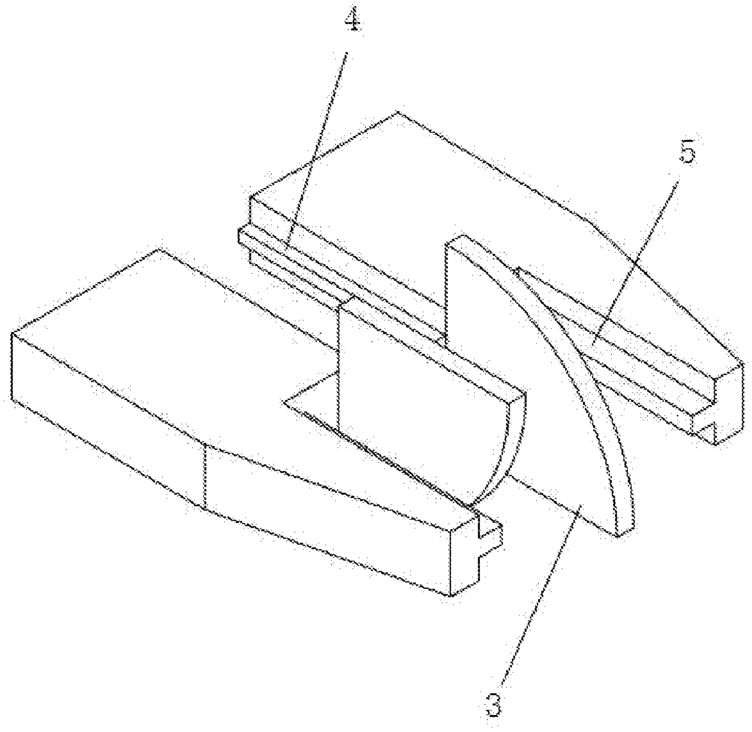
FIG. 17 is a schematic diagram of a partial structure of a circularly polarized antenna according to Embodiment 3 of the present disclosure (rotating counterclockwise by 90 degrees in FIG. 13).
Figure 18:
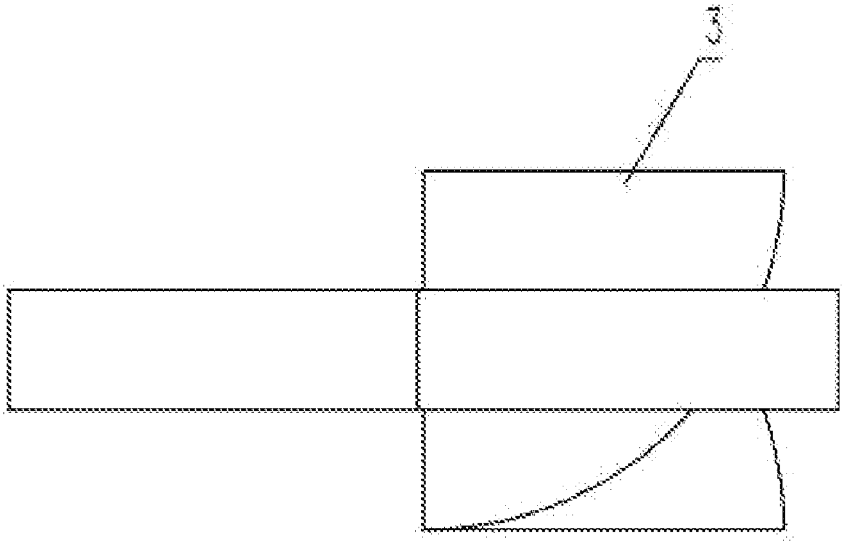
FIG. 18 is a schematic structural diagram of projection of a baffle in a circularly polarized antenna in a vertical direction according to Embodiment 3 of the present disclosure.
Figure 19:
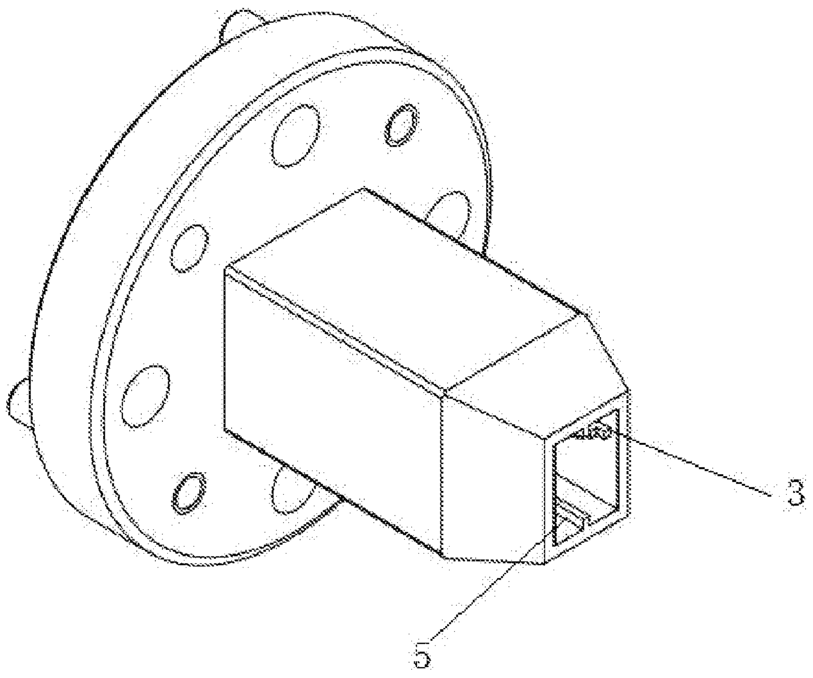
FIG. 19 is a schematic diagram of a three-dimensional structure of a circularly polarized antenna according to Embodiment 4 of the present disclosure.
Figure 20:
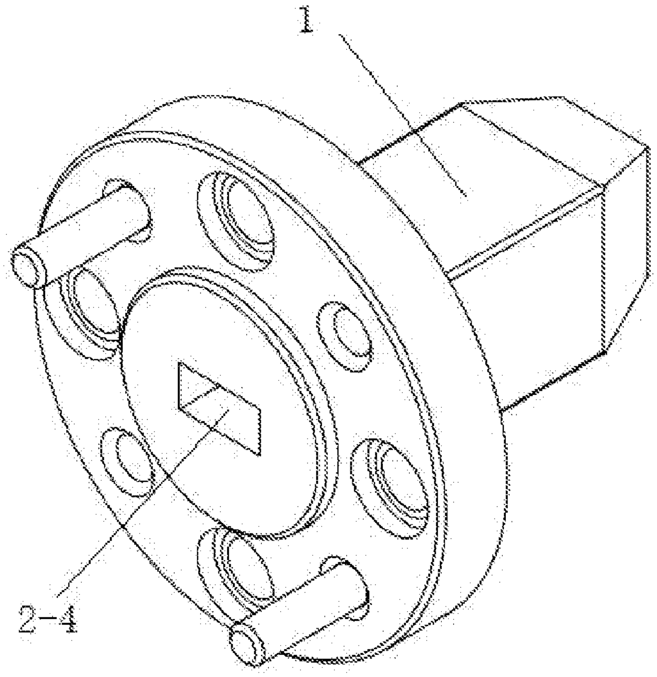
FIG. 20 is a schematic diagram of a three-dimensional structure of a circularly polarized antenna according to Embodiment 4 of the present disclosure.
Figure 21:
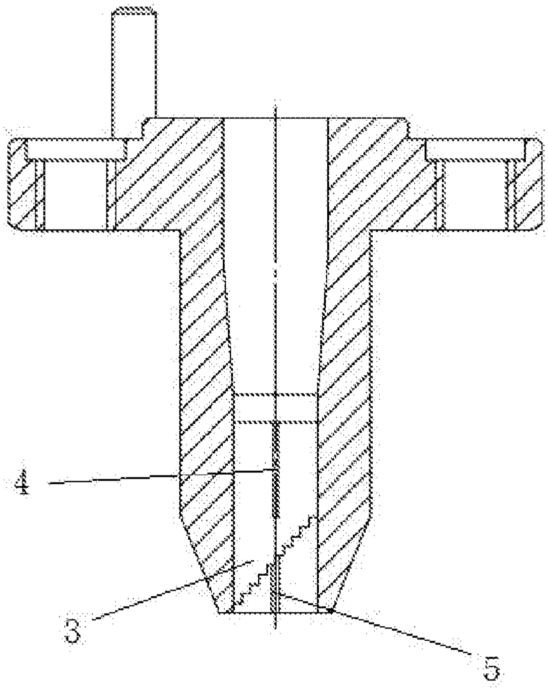
FIG. 21 is a schematic diagram of a cross-sectional structure of a circularly polarized antenna according to Embodiment 4 of the present disclosure.
Figure 22:
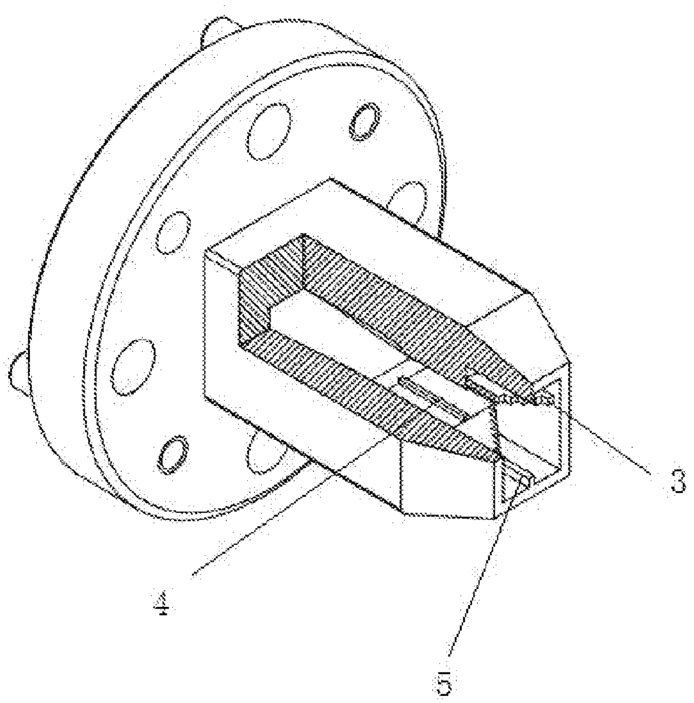
FIG. 22 is a schematic diagram of a partial cross-sectional structure of a circularly polarized antenna according to Embodiment 4 of the present disclosure.

In some embodiments, as shown in FIG. 17 to FIG. 18, the two baffles 3 are in a shape like a right-angled triangle as a whole, and the two baffles 3 are arranged in parallel and partially overlap in a vertical projection direction, where the overlapping area should not be too large or too small and moderate. A bevel edge of one baffle 3 of the two baffles faces leftwards, and a bevel edge of the other baffle 3 of the two baffles faces rightwards, so that the two second rectangular ridges 5 are separated in a vertical direction through the two baffles 3, projections of the bevel edges of the two baffles 3 in the vertical direction are arc-shaped, and two right-angle sides of each baffle 3 are fixed to the inner wall of the baffle mounting rectangular section 2-1. It is to be noted that the vertical direction indicated in this embodiment is relative to that shown in FIG. 16.

Embodiment 4

As shown in FIG. 19 to FIG. 24, in a compact broadband circularly polarized antenna in the embodiment of the present disclosure, a distance between an upper inner wall and a lower inner wall of the front rectangular mounting section 2-1 is greater than a distance between an upper inner wall and a lower inner wall of the front rectangular mounting section 2-2, so that an opening of the compact broadband circularly polarized antenna is relatively large. One first rectangular ridge 4 is formed in a middle of each of the upper inner wall and the lower inner wall of the front rectangular mounting section 2-2, two first rectangular ridges 4 are oppositely arranged, one second rectangular ridge 5 is formed in the middle of each of the upper inner wall and the lower inner wall of the baffle mounting rectangular section 2-1, two second rectangular ridges 5 are oppositely arranged, and two baffles 3 are respectively fixed between the first rectangular ridge 4 and the second rectangular ridge 5 on a corresponding side.

Figure 23:
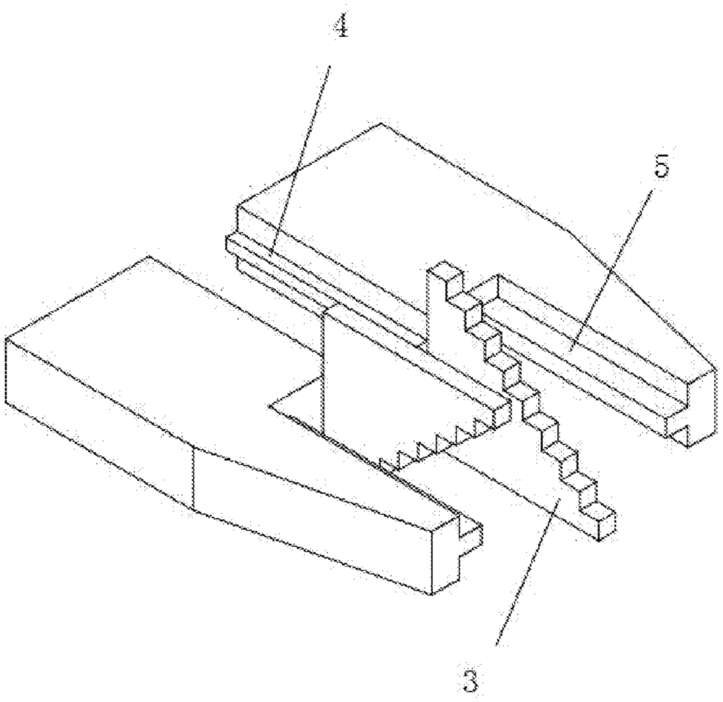
FIG. 23 is a schematic diagram of a partial structure of a circularly polarized antenna according to Embodiment 4 of the present disclosure (rotating counterclockwise by 90 degrees in FIG. 19).
Figure 24:
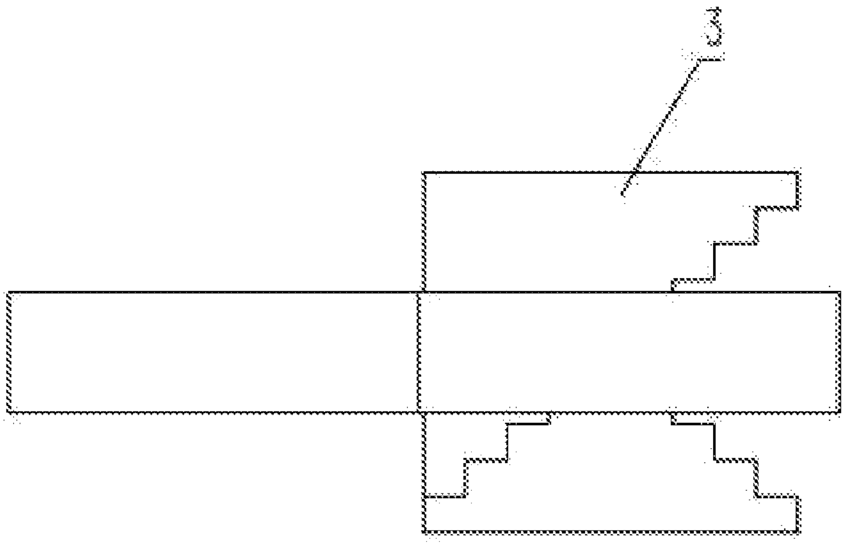
FIG. 24 is a schematic structural diagram of projection of a baffle in a circularly polarized antenna in a vertical direction according to Embodiment 4 of the present disclosure.

In some embodiments, as shown in FIG. 23 to FIG. 24, the two baffles 3 are in a shape like a right-angled triangle as a whole, the two baffles 3 are arranged in parallel and partially overlap in a vertical projection direction, where the overlapping area should not be too large or too small and moderate. A bevel edge of one baffle 3 of the two baffles faces leftwards, and a bevel edge of the other baffle 3 of the two baffles faces rightwards, so that the two second rectangular ridges 5 are separated in a vertical direction through the two baffles 3, projections of the bevel edges of the two baffles 3 in the vertical direction are stepped, and two right-angle sides of each baffle 3 are fixed to the inner wall of the baffle mounting rectangular section 2-1. It is to be noted that the vertical direction indicated in this embodiment is relative to that shown in FIG. 22.

Figure 26:
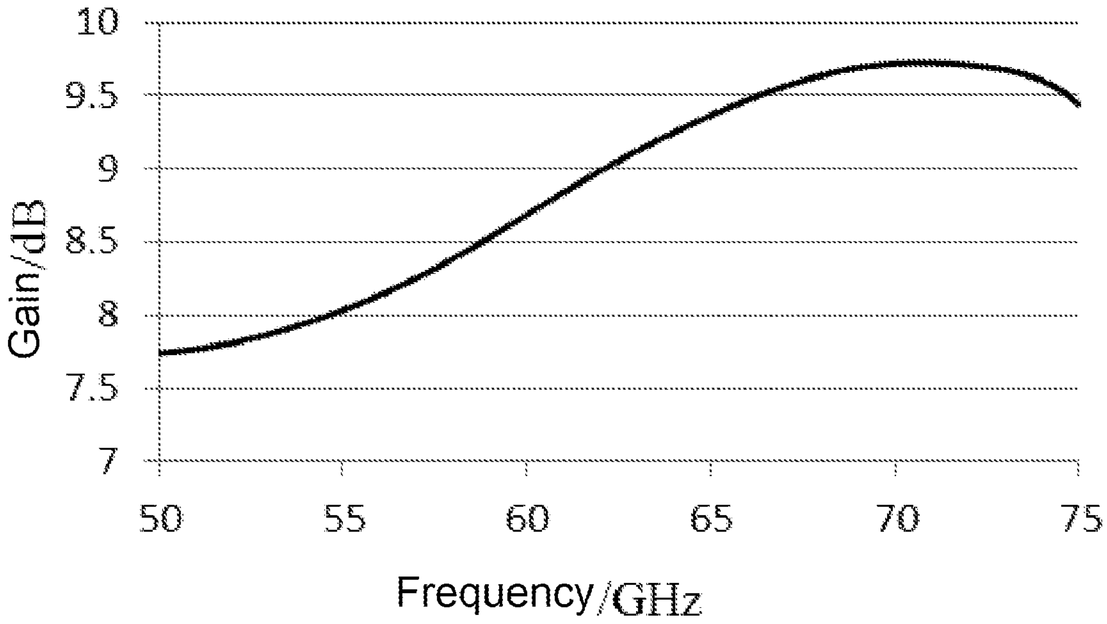
FIG. 26 is a gain curve diagram of an antenna according to an embodiment of the present disclosure.
Figure 27:
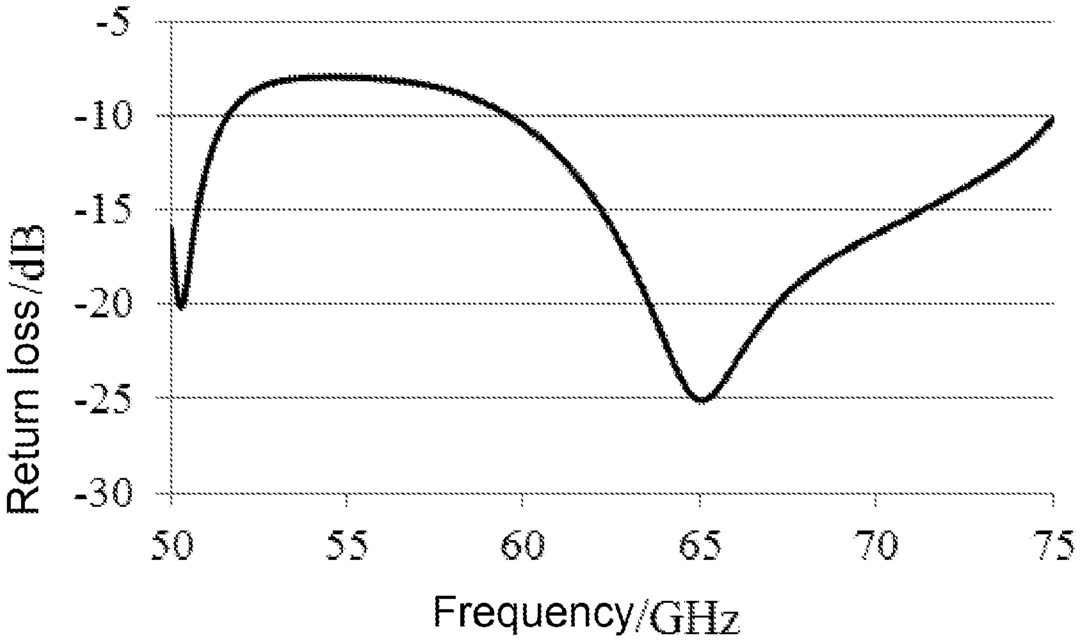
FIG. 27 is a return loss curve graph of an antenna according to an embodiment of the present disclosure.
Figure 28:
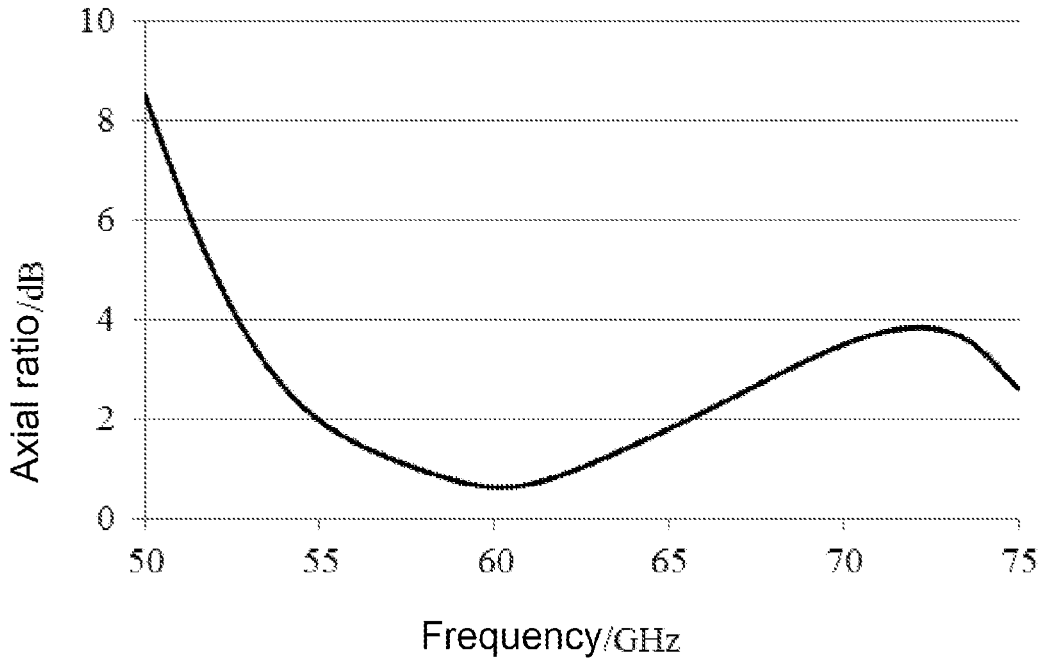
FIG. 28 is an axial ratio curve diagram of an antenna according to an embodiment of the present disclosure.
Figure 29:
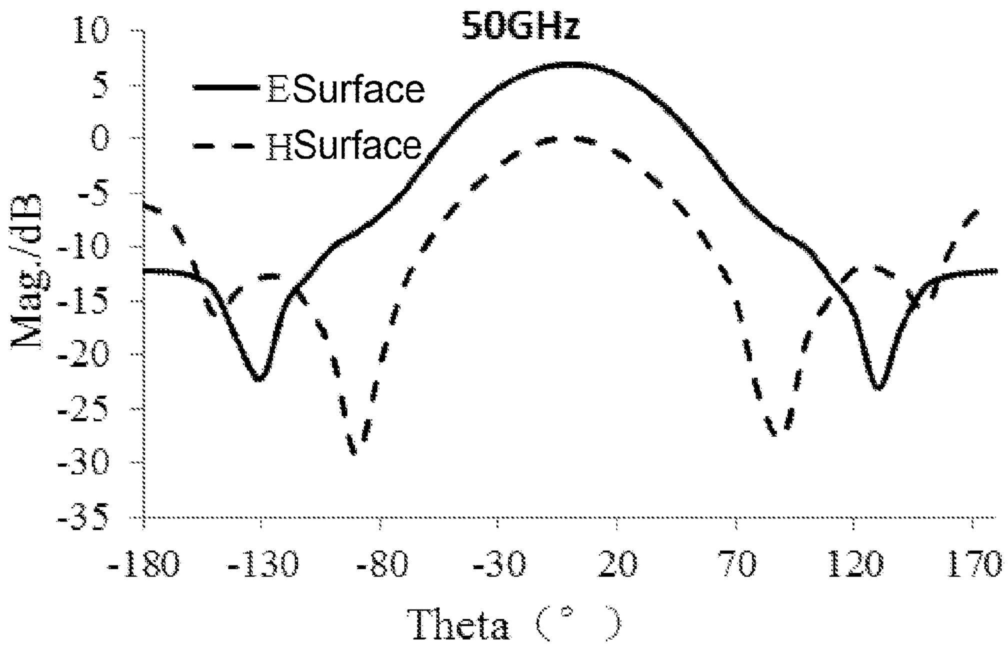
FIG. 29 is a directional diagram of an antenna at 50 Hz according to an embodiment of the present disclosure.
Figure 30:
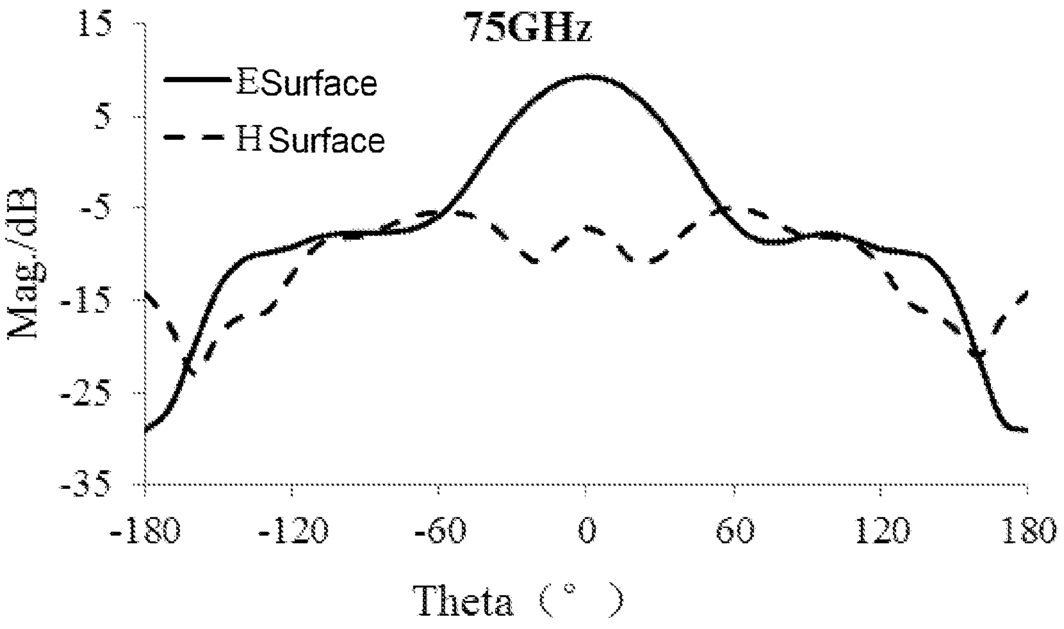
FIG. 30 is a directional diagram of an antenna at 75 Hz according to an embodiment of the present disclosure.

FIG. 26 is a gain curve diagram of an antenna according to an embodiment of the present disclosure. FIG. 27 is a return loss curve graph of an antenna according to an embodiment of the present disclosure. FIG. 28 is an axial ratio curve diagram of an antenna according to an embodiment of the present disclosure. FIG. 29 is a directional diagram of an antenna at 50 Hz according to an embodiment of the present disclosure. FIG. 30 is a directional diagram of an antenna at 75 Hz according to an embodiment of the present disclosure. It is to be noted that the specific structures of the ridge and the baffle in the present disclosure are not limited to the above structure, but may also be in other forms, which will not be elaborated herein.

What is claimed is:

1. A compact broadband circularly polarized antenna, comprising an antenna body, wherein a cavity is formed in the antenna body, a plurality of ridges and a plurality of baffles are formed inside the cavity, the ridges are configured for antenna miniaturization and bandwidth widening, and the baffles are configured to form a phase difference; wherein the cavity comprises a baffle mounting rectangular section located on a rightmost side, wherein a front rectangular mounting section is formed on a left side of the baffle mounting rectangular section, an intermediate transition section is formed on a left side of the front rectangular mounting section, and a rear rectangular section with a standard rectangular waveguide port is formed on a left side of the intermediate transition section;

wherein a middle of each of the upper inner wall and the lower inner wall of the front rectangular mounting section and a middle of each of the upper inner wall and the lower inner wall of the baffle mounting rectangular section are respectively formed with the ridges, a projection height of the ridges on the upper inner wall and the lower inner wall are less than a half of a width of inner walls located between the upper inner wall and the lower inner wall, the baffles are located in the baffle mounting rectangular section and is located between the upper inner wall and the lower inner wall, and each of the baffles extends from one of the inner walls to the other one of the inner walls between the upper inner wall and the lower inner wall, and a height of the baffles in an extension direction is greater than a half of a width of the upper inner wall and the lower inner wall.

2. The compact broadband circularly polarized antenna as claimed in claim 1, wherein a distance between an upper inner wall and a lower inner wall of the baffle mounting rectangular section is greater than a distance between an upper inner wall and a lower inner wall of the front rectangular mounting section, one first rectangular ridge is formed in a middle of each of the upper inner wall and the lower inner wall of the front rectangular mounting section, two first rectangular ridges are oppositely arranged, one second rectangular ridge is formed in a middle of each of the upper inner wall and the lower inner wall of the baffle mounting rectangular section, two second rectangular ridges are oppositely arranged, and two baffles are respectively fixed in the baffle mounting rectangular section between the first rectangular ridge and the second rectangular ridge on a corresponding side.

3. The compact broadband circularly polarized antenna as claimed in claim 2, wherein the two baffles are in a shape of a right-angled triangle as a whole, and the two baffles are arranged in parallel and partially overlap in a vertical projection direction, wherein a bevel edge of one baffle of the two baffles faces leftwards, and a bevel edge of the other baffle of the two baffles faces rightwards, so that the two second rectangular ridges are separated in a vertical direction through the two baffles, projections of the bevel edges of the two baffles in the vertical direction are oblique lines, and two right-angle sides of each baffle are fixed to the inner wall of the baffle mounting rectangular section.

4. The compact broadband circularly polarized antenna as claimed in claim 1, wherein a distance between an upper inner wall and a lower inner wall of the baffle mounting rectangular section is greater than a distance between an upper inner wall and a lower inner wall of the front rectangular mounting section, one first rectangular ridge is formed in a middle of each of the upper inner wall and the lower inner wall of the front rectangular mounting section, two first rectangular ridges are oppositely arranged, one first curve ridge is formed in a middle of each of the upper inner wall and the lower inner wall of the baffle mounting rectangular section, two first curve ridges are oppositely arranged, and two baffles are respectively fixed between the first rectangular ridge and the first curve ridge on a corresponding side.

5. The compact broadband circularly polarized antenna as claimed in claim 4, wherein the two baffles are in a shape of a right-angled triangle as a whole, and the two baffles are arranged in parallel and partially overlap in a vertical projection direction, wherein a bevel edge of one baffle of the two baffles faces leftwards, and a bevel edge of the other baffle of the two baffles faces rightwards, so that the two first curve ridges are separated in a vertical direction through the two baffles, projections of the bevel edges of the two baffles in the vertical direction are oblique lines, and two right-angle sides of each baffle are fixed to the inner wall of the baffle mounting rectangular section.

6. The compact broadband circularly polarized antenna as claimed in claim 1, wherein a distance between an upper inner wall and a lower inner wall of the baffle mounting rectangular section is greater than a distance between an upper inner wall and a lower inner wall of the front rectangular mounting section, one first rectangular ridge is formed in a middle of each of the upper inner wall and the lower inner wall of the front rectangular mounting section, two first rectangular ridges are oppositely arranged, one second rectangular ridge is formed in a middle of each of the upper inner wall and the lower inner wall of the baffle mounting rectangular section, two second rectangular ridges are oppositely arranged, and two baffles are respectively fixed between the first rectangular ridge and the second rectangular ridge on a corresponding side; and the two baffles are in a shape like a right-angled triangle as a whole, and the two baffles are arranged in parallel and partially overlap in a vertical projection direction, wherein a bevel edge of one baffle of the two baffles faces leftwards, and a bevel edge of the other baffle of the two baffles faces rightwards, so that the two second rectangular ridges are separated in a vertical direction through the two baffles, projections of the bevel edges of the two baffles in the vertical direction are arc-shaped, and two right-angle sides of each baffle are fixed to the inner wall of the baffle mounting rectangular section.

7. The compact broadband circularly polarized antenna as claimed in claim 1, wherein a distance between an upper inner wall and a lower inner wall of the baffle mounting rectangular section is greater than a distance between an upper inner wall and a lower inner wall of the front rectangular mounting section, one first rectangular ridge is formed in a middle of each of the upper inner wall and the lower inner wall of the front rectangular mounting section, two first rectangular ridges are oppositely arranged, one second rectangular ridge is formed in a middle of each of the upper inner wall and the lower inner wall of the baffle mounting rectangular section, two second rectangular ridges are oppositely arranged, and two baffles are respectively fixed between the first rectangular ridge and the second rectangular ridge on a corresponding side; and the two baffles are in a shape like a right-angled triangle as a whole, and the two baffles are arranged in parallel and partially overlap in a vertical projection direction, wherein a bevel edge of one baffle of the two baffles faces leftwards, and a bevel edge of the other baffle of the two baffles faces rightwards, so that the two second rectangular ridges are separated in a vertical direction through the two baffles, projections of the bevel edges of the two baffles in the vertical direction are stepped, and two right-angle sides of each baffle are fixed to the inner wall of the baffle mounting rectangular section.

8. The compact broadband circularly polarized antenna as claimed in claim 1, wherein the antenna body comprises a flange located on a periphery of the cavity, wherein a plurality of flange mounting holes and at least one positioning hole are formed in a circumferential direction of the flange.

9. The compact broadband circularly polarized antenna as claimed in claim 8, wherein positioning dowels are arranged in the positioning holes.

* * * * *